(12) United States Patent
Fang (10) Patent No.: US 12,169,181 B2
(45) Date of Patent: Dec. 17, 2024

(54) TRANSMISSION IMAGING DETECTION DEVICE AND ITS COMPUTERIZED TOMOGRAPHY SYSTEM

(71) Applicant: Zheng Fang, Xiamen (CN)

(72) Inventor: Zheng Fang, Xiamen (CN)

(73) Assignee: XIAMEN UNIVERSITY, Xiamen (CN)

( * ) Notice: Subject to any disclaimer, the term of this patent is extended or adjusted under 35 U.S.C. 154(b) by 505 days.

(21) Appl. No.: 17/600,123

(22) PCT Filed: Sep. 19, 2019

(86) PCT No.: PCT/CN2019/106732
§ 371 (c)(1),
(2) Date: Sep. 30, 2021

(87) PCT Pub. No.: WO2021/046883
PCT Pub. Date: Mar. 18, 2021

(65) Prior Publication Data
US 2022/0205932 A1    Jun. 30, 2022

(51) Int. Cl.
*G01N 23/046* (2018.01)
*G01N 23/083* (2018.01)
*G01N 23/10* (2018.01)

(52) U.S. Cl.
CPC ......... *G01N 23/046* (2013.01); *G01N 23/083* (2013.01); *G01N 23/10* (2013.01); *G01N 2223/419* (2013.01)

(58) Field of Classification Search
CPC .... G01N 23/083; G01N 23/10; G01N 23/046; G01N 2223/612; G01N 2223/643;
(Continued)

(56) References Cited

U.S. PATENT DOCUMENTS

| 8,401,146 B2 * | 3/2013 | Vorhees | G01N 21/8901 378/57 |
| 11,747,509 B2 * | 9/2023 | Prabhu | G01N 23/04 378/57 |

(Continued)

FOREIGN PATENT DOCUMENTS

| CN | 1794951 A | 6/2006 |
| CN | 1916611 A | 2/2007 |

(Continued)

OTHER PUBLICATIONS

International Search Report issued in corresponding International application No. PCT/CN2019/106732, mailed Apr. 1, 2020.
(Continued)

*Primary Examiner* — Irakli Kiknadze
(74) *Attorney, Agent, or Firm* — Jeenam Park (57) ABSTRACT

A transmission imaging detection device (10) is used to collect projection diagrams of measured objects (200) on a conveyor belt (100), comprising X-ray projection imaging devices and laser occlusion sensing devices, the measured objects (200) shifts across the X-ray projection imaging devices and laser occlusion sensing devices on the said conveyor belt (100), and the laser occlusion sensing devices determines whether the measured objects (200) enter the detection segments, the X-ray projection imaging devices collect projection data of the measured objects (200). The transmission imaging detection device (10) combines the translation motion of the measured objects (200) to complete the data acquisition required for real-time CT slice imaging. The computerized tomography system using the above-mentioned transmission imaging detection device (10) ultimately realizes the real-time reconstruction, storage and display of CT slices by bus data transmission and cluster operation.

9 Claims, 5 Drawing Sheets

(58) Field of Classification Search
CPC ......... G01N 2223/03; G01N 2223/419; G01N 33/12; G01N 33/02; G01N 23/12; G01N 21/93; G01N 23/087; G01N 23/06; G01N 23/04; G01N 21/255; G01N 21/85; G01N 2223/423; G01N 2021/933; G01N 2223/505; G01N 2223/345; G01N 2021/258; G01N 2223/501; G01N 23/18; G01N 23/223; G01N 2223/645; G01N 2223/321; G01N 2223/402; G01N 23/207; G01N 23/20; G01N 23/20083; G01N 2223/3302; G01N 2223/6113; G01V 5/224; G01V 5/20; G01V 3/165; G01V 3/00; G01V 8/005; G01V 5/22; G01V 5/222; G01V 5/226; G01V 5/0041; G01V 5/005; G07C 9/28; G07C 9/257; G06Q 50/265; G06Q 10/087; G08B 21/182; G01J 3/02; G01J 3/28; G01G 9/005; G01B 15/045; G01B 15/025; G01B 15/04; A61B 6/584; A61B 6/027; A61B 6/03; A61B 6/466; G02B 30/50; G06T 7/0004; G06T 7/001; G06T 7/0008; G06T 7/60; G06T 5/50; G06T 2200/32; G06T 2207/10016; G06T 2207/20221; G06T 2207/30242; G06T 11/003; H01J 35/06; H01J 2235/068; H01J 35/13; H01J 2235/1262; H01J 35/16; H01J 2235/1245; H01J 35/12; H01J 35/08; H01J 35/14; H01J 35/064; H01J 2235/062; G06V 20/52; B65G 43/00; G01T 1/178; G01T 1/2985
USPC ..................................... 378/4, 19, 57, 58, 62
See application file for complete search history.

(56) References Cited

U.S. PATENT DOCUMENTS

| | | |
|---|---|---|
| 2002/0181649 A1 | 12/2002 | Rasche |
| 2005/0066022 A1* | 3/2005 | Liebenow ............... H04L 12/12 |
| | | 709/223 |
| 2006/0078085 A1 | 4/2006 | Zanker |
| 2006/0140340 A1 | 6/2006 | Kravis |
| 2013/0211230 A1* | 8/2013 | Sperling ................ A61B 8/565 |
| | | 600/425 |
| 2016/0176646 A1 | 6/2016 | Singh |
| 2019/0137651 A1* | 5/2019 | Bendahan ................ G01V 5/22 |

FOREIGN PATENT DOCUMENTS

| | | |
|---|---|---|
| CN | 1971414 A | 5/2007 |
| CN | 101071109 A | 11/2007 |
| CN | 101082595 A | 12/2007 |
| CN | 101371786 A | 2/2009 |
| CN | 101455574 A | 6/2009 |
| CN | 102099708 A | 6/2011 |
| CN | 102422178 A | 4/2012 |
| CN | 103760180 A | 4/2014 |
| CN | 103901040 A | 7/2014 |
| CN | 208887578 U | 5/2019 |
| DE | 102006026945 A1 | 12/2007 |
| JP | 2009510557 A | 3/2009 |

OTHER PUBLICATIONS

Written Opinion of the International Search Authority in corresponding International application No. PCT/CN2019/106732.
First Office Action from China Patent Office in a counterpart Chinese Patent Application 201910887156.9, Mailed Aug. 4, 2021.

* cited by examiner

TRANSMISSION IMAGING DETECTION DEVICE AND ITS COMPUTERIZED TOMOGRAPHY SYSTEM

TECHNICAL FIELD

The present disclosure relates to the technical field of industrial on-line nondestructive testing, in particular to a real-time X-ray transmission imaging detection device and a real-time computerized tomography system.

BACKGROUND

Computerized tomography (CT) is widely used in medical imaging and industrial nondestructive testing. Because CT slice imaging requires a large amount of projection data acquisition and complex algorithm, improving its speed is one of the research focuses in this field. Researchers have started to speed up CT imaging by hardware architecture and algorithm implement improvement, but there is not any actual device entity or design that can achieve clear slice imaging.

Conventional computerized tomography requires rotational motion to complete multi-angle projection sampling, so that real-time slice imaging cannot be achieved. Currently, imaging planes of the light transmitters and detectors in existing multi-light transmitters and multi-detectors CT system are coincident, and and form a certain angle in a same plane. The disadvantages of this architecture are: (1) the X-ray sources include components such as tubes and high voltage generators, and the detectors include photosensitive materials, analog-to-digital conversion circuits, data interface circuits, etc. But the circumference diameter is limited and the space is limited, it is difficult to accommodate too many light transmitter/detector sets in engineering design; (2) if each of the light transmitters is assumed to be a particle and each of the X-ray array detector is assumed to be a linear segment, as the number of light transmitter/detector sets increases, the effective detection field stretching angle of each of light transmitter/detector sets decreases and the imaging segment of CT slice decreases consequently.

SUMMARY

The present disclosure provides an X-ray transmission imaging detection device and a real-time computerized tomography imaging system, which can effectively solve the above problems. By using a complete X-ray light transmitters and detectors installation configuration, and combining the translation movement of the measured objects, the data acquisition required for real-time CT slice imaging can be completed. The real-time reconstruction, storage and display of CT slice images are finally achieved by bus data transmission and cluster operation.

The present disclosure is implemented as follows: a transmission imaging detection device for collecting projection diagrams of measured objects on a conveyor belt, the transmission imaging detection device comprises X-ray projection imaging devices and laser occlusion sensing devices, the measured objects translate across the X-ray projection imaging devices and laser occlusion sensing devices on the conveyor belt, and the laser occlusion sensing devices determine whether the measured objects enter detection segments, the X-ray projection imaging devices collect projection data of the measured objects entering the detection segments.

Further, the X-ray projection imaging devices comprise X-ray sources and X-ray array detectors, the laser occlusion sensing devices comprise laser transmitters and laser receivers, the X-ray sources and the X-ray array detectors are located on both sides of the thickness of the conveyor belt, the laser transmitters and laser receivers are located on both sides of the width of the conveyor belt.

Further, K X-ray sources and K X-ray array detectors form K sets of X-ray projection imaging devices, K laser transmitters and K laser receivers form K sets of laser occlusion sensing devices, K sets of X-ray projection imaging devices and laser occlusion sensing devices are arranged in sequence along the translation direction of the measured object.

Further, a plane formed by a center of each of X-ray sources and an effective sensory segment of each of the X-ray array detectors is a projection imaging plane, and K projection imaging planes are parallel to each others and not coplanar; a connection line between each of X-ray sources and a center of each of the X-ray array detectors is a central axis, and K central axes are not coplanar and form a certain angle to each others.

Further, the projection imaging plane and the central axes are perpendicular to the translation direction of the measured object.

Further, a scan angle range on a circumference covered by the K central axes comprises a full scan angle range or a short scan angle range: the full scan angle range covers $2\pi$ radians; the short scan angle range covers $\pi+2\gamma$ radians.

A computerized tomography system for imaging projection diagrams collected by a transmission imaging detection device, the computerized tomography system comprises the above mentioned transmission imaging detection device, and a cluster workstations and a graphic workstation connected with the transmission imaging detection device.

Further, detection signals of the laser occlusion sensing devices are reported to the cluster workstation by a control bus; data collected by the X-ray array detectors are uploaded to the cluster workstation by a data bus; and the cluster workstation uploads collected projection data to the cluster workstation by a transmission bus, the graphic workstation reconstructs a projection.

Further, if centers of all X-ray sources are projected onto a plane perpendicular to a direction of motion of the measured objects, all projections are distributed on a circumference with O as a center, and a radius of the circumference is defined as R; if centers of all X-ray detectors are projected onto a plane perpendicular to a direction of motion of the measured objects, all projections are also distributed on a circumference with O as a center, a radius of the circumference is defined as P, then a formula for calculating a image magnification of the projection imaging system is $Q=D/R$, here $D=R+P$, D is the distance from the centers of the X-ray source 11 to the centers of the detector 12.

Further, a update frequency of the projection diagram is equal to a sampling frequency of each of the X-ray array detectors.

The present disclosure relates to a real-time transmission imaging detection device which arranges multiple sets of X-ray projection imaging devices in turn along the translation direction of the measured objects, and does not have any rotational motion during the whole detection process, unlike conventional CT. Computerized tomography real-time imaging is achieved when the measured objects passe through all the projection imaging devices, and the refresh rate of the slice imaging can reach the sampling rate of a single detector.

BRIEF DESCRIPTION OF DRAWINGS

In order to provide a clearer explanation of the technical scheme of the present disclosure, the appended drawings that need to be used in the embodiment of the present disclosure will be briefly described below. It should be understood that the following appended drawings only show some of the practical results of the present disclosure and should not be considered as a limitation of scope. For ordinary technicians in the field, they may also obtain other relevant appended drawings basing on these appended drawings.

DETAILED DESCRIPTION

In order to make the purpose, technical scheme and advantages of the present disclosure clearer, the technical scheme of the present disclosure will be described dearly and completely in combination with the appended drawings in the present disclosure's embodiments. Obviously, the described embodiments are one part of the embodiments of the disclosure, not the whole embodiments. Based on the embodiments in the present disclosure, all other embodiment methods obtained by ordinary technicians in the field without creative work belong to the scope of protection of the present disclosure. Therefore, the following detailed description of the embodiments of the present disclosure provided in the appended drawings is not intended to limit the scope of the disclosure that requires protection, but merely to represent the selected embodiment of the present disclosure. Based on the embodiments in the present disclosure, all other embodiments obtained by ordinary technicians in the field without creative work belong to the scope of protection of the present disclosure.

The devices and methods disclosed in the present disclosure may be implemented in other ways. The device embodiment described is only schematic, for example, the division of the units described is only a kind of logical functional division, which can be implemented in a different way, for example, multiple units or components can be combined or integrated into another system, or some features can be ignored or not executed. On the other hand, the direct or indirect coupling or communication connection shown or discussed can be indirect coupling or communication connection through some other interfaces, devices or units, and can be electrical, mechanical, or other forms.

The present disclosure provides a transmission imaging detection device, in particular an X-ray real-time transmission imaging detection device, which is mainly used for industrial on-line nondestructive testing and real-time computerized tomography of biological tissue. Specifically, referring to FIG. 1, a transmission imaging detection device segment 10 is used to detect a measured object 200 on a conveyor belt 100. The conveyor belt 100 drives the measured object 200 to move horizontally at a speed of v, a direction of v is defined as z, a direction along the vertical line is defined as y, a direction perpendicular to v is defined as x, and the order of x, y and z axes satisfies the right-handed spiral rule. The specific directions are shown in the figures.

Figure 1:
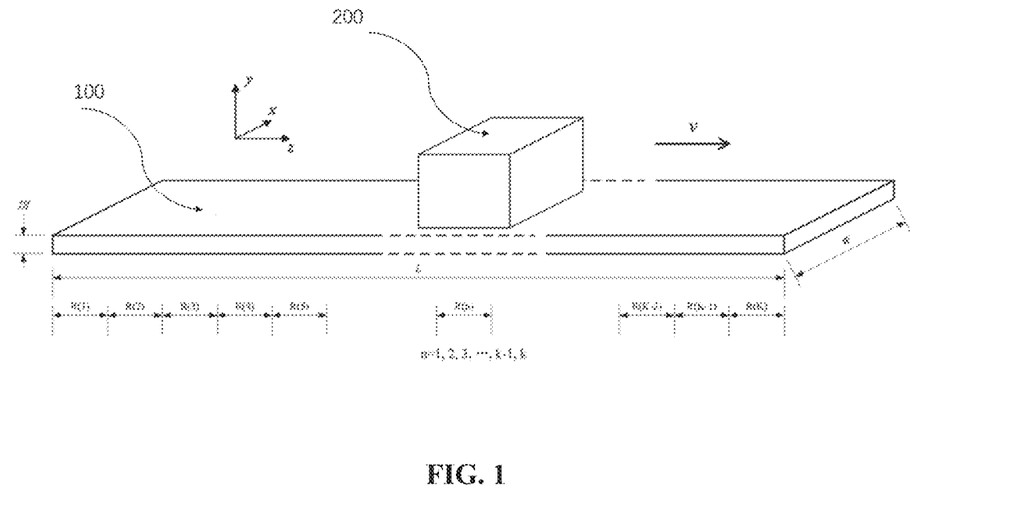
FIG. 1 is a diagram of an object being measured on a conveyor belt.

Wherein, the length of the conveyor belt 100 is L, the thickness is TH and the width is W. The conveyor belt 100 is divided into K segments along its length L range, and each K segment range is provided with a transmission imaging detection device segment, thus forming K transmission imaging detection device segments.

Figure 2:
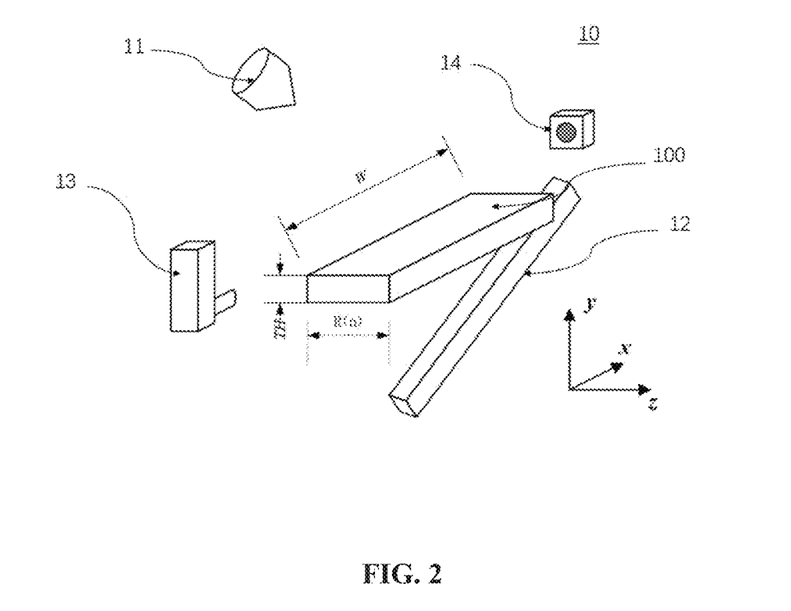
FIG. 2 is an installation diagram of a transmission imaging detection device segment of the disclosure.

Referring to FIG. 2, each of the described transmission imaging detection device segment 10 includes an X-ray source 11, an X-ray array detector 12, a laser transmitter 13, and a laser receiver 14. Therefore, a total of K X-ray light transmitters, K X-ray array detectors, K laser transmitters, and K laser receivers need to be installed on the entire conveyor belt 100. The length of the L direction occupied by the $n^{th}$ segment is assigned to R(n), where $n \in [1, K]$ and is an integer. The length L of conveyor belt 100 is the effective imaging section length. The X-ray source 11 and the X-ray array detector 12 constitute an X-ray projection imaging device 40.

Specifically, when the translation speed of the measured object 200 v=0.2 m/s and the sampling frequency of the X-ray detector f=20 Hz, the distance of the adjacent slice plane during tomography s=v/f=0.2/20=0.01 m=10 mm. The length of R(n) must be set to an integer multiple of s, where $n \in [1, K]$ and is an integer. The distance between adjacent slice imagings can be adjusted by changing two parameters of the measured object's translation speed and the detector's sampling frequency, which is calculated by dividing the measured object's translation speed by the detector's sampling frequency.

Let's describe the location and installation of the transmission imaging detection device segment 10 with the conveyor belt 100 and the measured object 200. Referring to FIG. 2, which is a schematic diagram of the installation of the transmission imaging detection device segment 10 on the $n^{th}$ segment of the conveyor belt 100, where $n \in [1,K]$ and is an integer. The X-ray source 11 of the nth segment and the imaging path of the X-ray array detector 12 are in the xy plane. The connection line between the center of the laser transmitter 13 and the laser receiver 14 is parallel to the x-axis. Further, the X-ray source 11 and the X-ray array detector 12 are located on both sides of the thickness TH of the conveyor belt 100, and the laser transmitter 13 and the laser receiver 14 are located on both sides of the width W of the conveyor belt 100.

Figure 3:
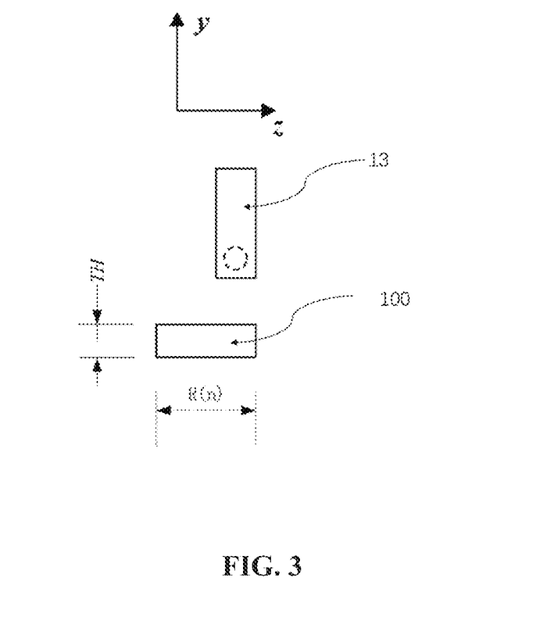
FIG. 3 is a main view of the geometrical placement of a laser transmitter of the transmission imaging detection device shown in FIG. 2.
Figure 4:
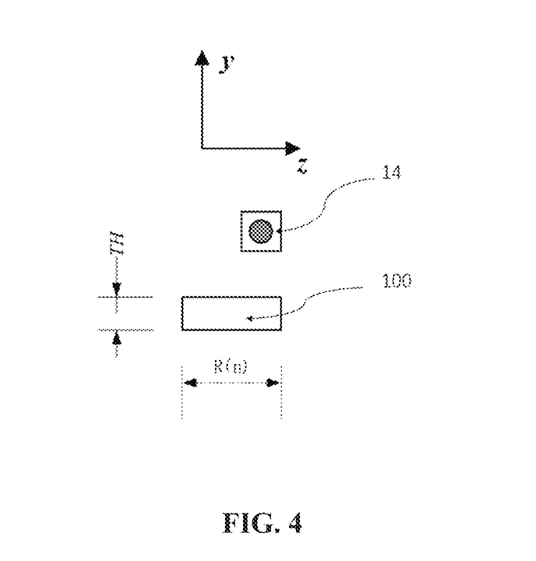
FIG. 4 is a main view of the geometrical placement of a laser receiver shown in FIG. 2.
Figure 5:
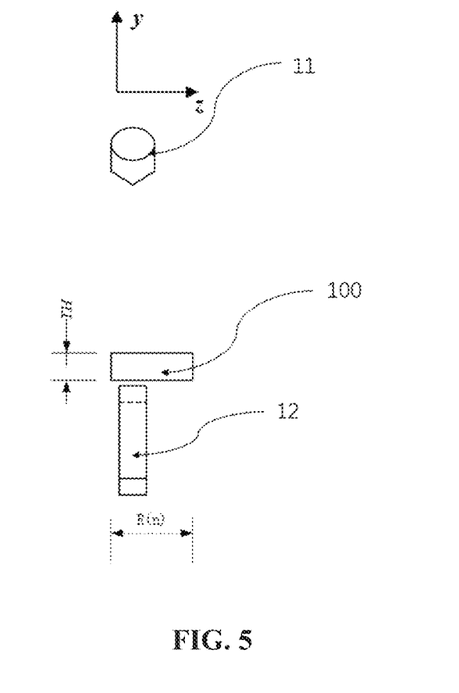
FIG. 5 is a main view of an X-ray source and a X-ray array detector shown in FIG. 2.

Referring to FIG. 3, FIG. 4 and FIG. 5, wherein FIG. 3 is the main view of the laser transmitter 13, FIG. 4 is the main view of the laser receiver 14, the main view defined in this embodiment is the perspective view along the x-direction, and FIG. 5 is the main view of the X-ray source 11 and the X-ray array detector 12. the X-ray array detector 12 described can be a linear detector or an arc detector.

Figure 6:
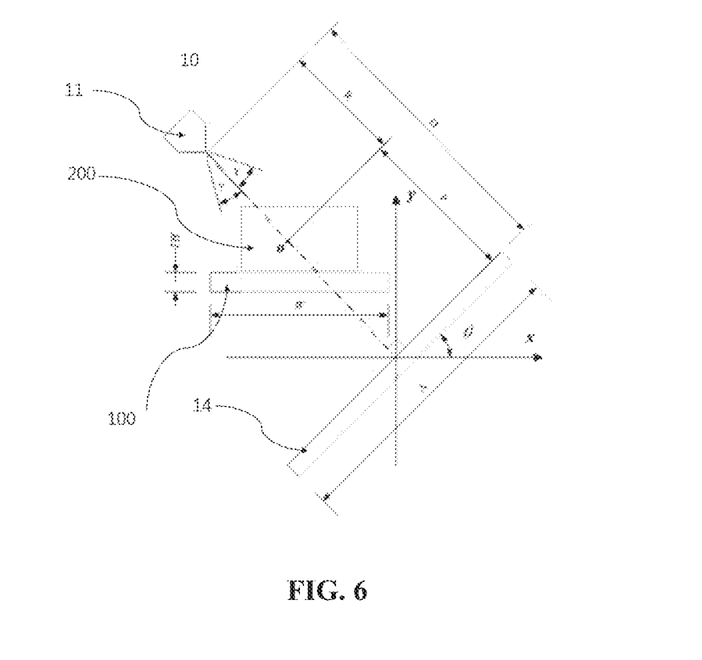
FIG. 6 is a right view of the X-ray source and the X-ray array detector as shown in FIG. 2.

Referring to FIG. 6, which is the right view of the X-ray source 11 and the X-ray array detector 12. The right view described in this embodiment is a perspective view along the opposite direction of z. The length of the X-ray array detector 12 is A, the length of the X-ray source 11 to the midpoint of the X-ray array detector 12 is D, and the central line of the X-ray source 11 to the X-ray array detector 12 is perpendicular to the X-ray array detector 12. The angle between the X-ray array detector and the x-axis is θ, wherein θ=nα, here α is the rotation step angle of CT projection sampling. The center of rotation should be close to the center of the measured object 200 at point O. When the CT system is designed for full scan mode, α=2π/K; when the CT system is designed for short scan mode, α=(π+2γ)/K. Wherein, γ is the maximum fan angle, and the formula is that when X-Scan P01040614 is selected as the X-ray detector, A=614 mm is selected for array detector, and the distance D from the X-ray source to the center of the detector is designed to be 2000 mm, then the maximum fan angle γ=arctan 614/(2*2000)=0.1523 radians, or saying 8.727 degrees. When the CT system is designed for full scan mode and K is set to 128, the rotation step angle is π/64 radians, or 2.8125 degrees; when the CT system is designed for short scan mode and K is set to 128, the rotation step angle is 0.0269 radians, or 1.5426 degrees. The XRB80N100 can be selected to be the X-ray source. When the distance R from the center of the light transmitter to the center of rotation O is 125 mm, and according to the system magnification formula, the projection imaging amplification Q=D/R=2000/1250=1.6 times.

The plane composed of the center of each X-ray source 11 and the effective sensory segment of the X-ray array detector 12 is defined as a projection imaging plane, then K projection imaging planes are not coplanar and parallel to each other; and the connecting line between the center of an X-ray source 11 and the center of the corresponding X-ray array detector 12 is defined as a central axis, then K central axis are not coplanar and not parallel to each other. The projection imaging planes and the central axes are all perpendicular to the translation direction of the measured object.

Figure 7:
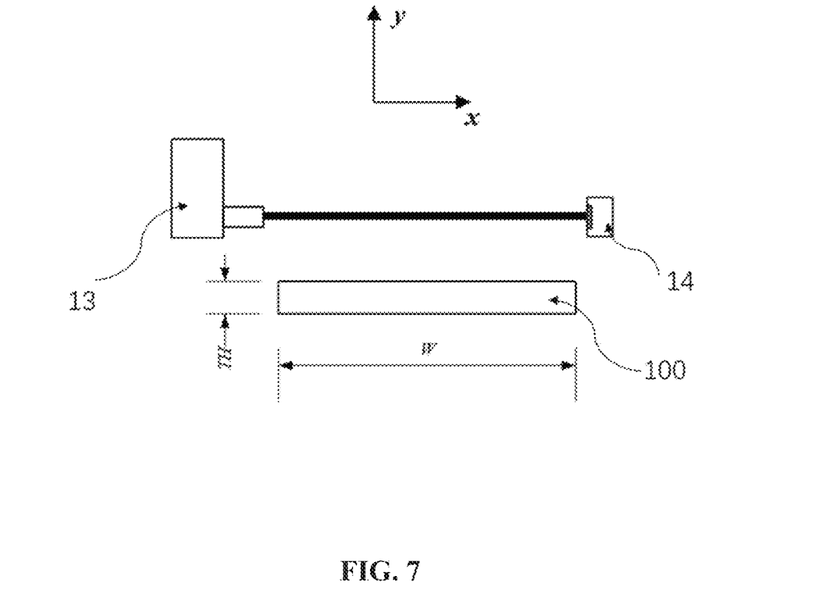
FIG. 7 is a diagram showing that a laser occlusion sensing device detects the measured object absence as shown in FIG. 2.
Figure 8:
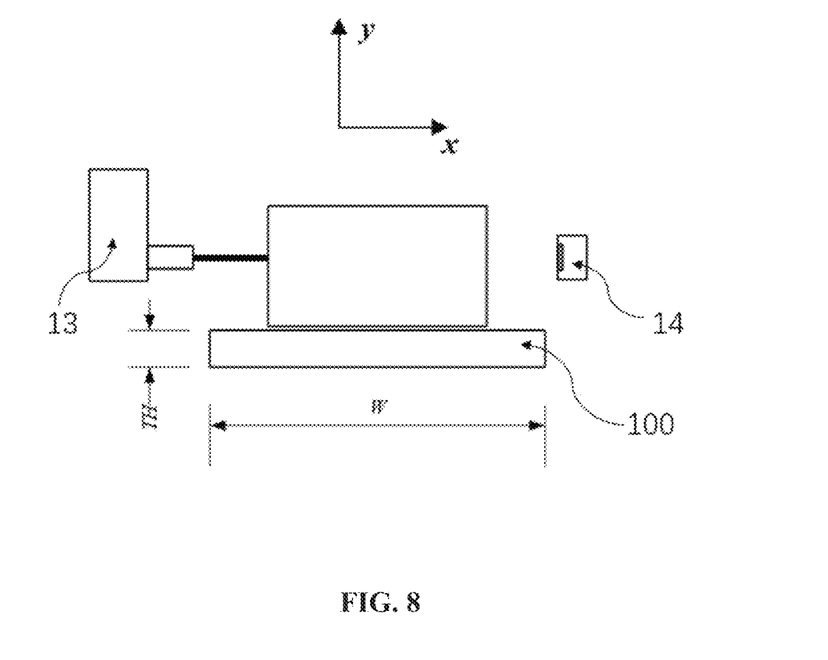
FIG. 8 is a diagram showing the laser occlusion sensing device detects the measured object existence as shown in FIG. 7.

Referring to FIGS. 7 and 8, wherein the laser transmitter 13 and the laser receiver 14 form a laser occlusion sensing device 20. Specifically, when the $n^{th}$ segment does not have an entity of the measured object 200, the laser emitted by the laser transmitter 13 travels in a straight line to the sensitive segment of the laser receiver 14, as shown in FIG. 7; when the $n^{th}$ segment has an entity of the measured object 200, the laser emitted by the laser transmitter 13 travels is obscured and cannot be propagated to the sensitive segment of the laser receiver 14, as shown in FIG. 8. The basis for judging whether an entity of the measured object 200 enters the nth segment detection segment is the instant when the mutation occurs from FIG. 7 to FIG. 8, and the basis for judging whether an entity of the measured object 200 moves out of the nth segment detection segment is the instant when the mutation occurs from FIG. 8 to FIG. 7. The laser occlusion sensing device can use OMRON's E3JK-TR12-L-D.

In the transmission imaging detection device segment 10 of the present disclosure X-ray sources 11 and X-ray array detectors 12 are arranged in turn along the translation direction of the measured object 200. All X-ray sources 11 and X-ray array detectors 12 projection imaging planes are parallel to each other and perpendicular to the translation direction of the measured object 200. The center connection lines of the X-ray sources 11 and the X-ray array detectors of the adjacent segments are of a certain angled with each other. The measured object 200 moves along a straight line, and then passes through all the projection imaging planes to complete the multi-angle projection data collection required for CT reconstruction. The reconstruction software can display in real time all the slice images that have been collected from the projection data. The computerized tomography system is suitable for use with pipelining and conveyor belts. When the translation speed of the measured object is v and the sampling frequency of the X-ray detector is f, the distance between the planes on which the adjacent slices are located s=v/f.

Figure 9:
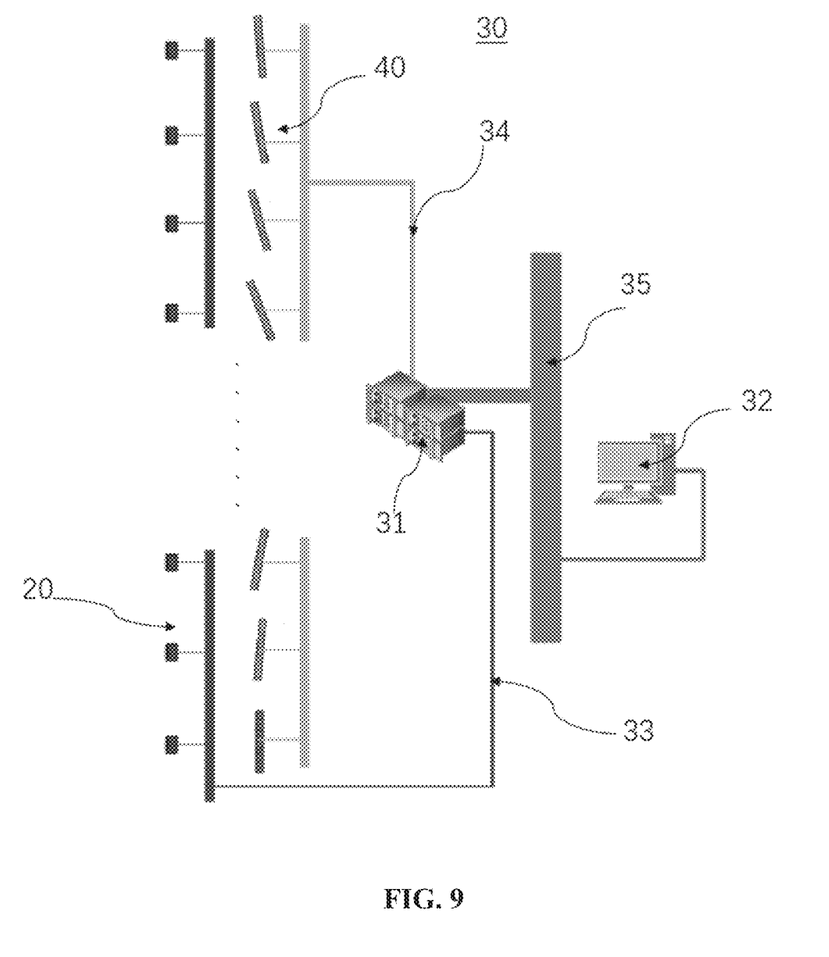
FIG. 9 is a system structure diagram of a computerized tomography imaging system of the present disclosure.

The present disclosure also provides a computerized tomography system 30 using the above-mentioned transmission imaging detection device. Referring to FIG. 9, because of the large amount of information collected from X-ray projection data and complexity of slice reconstruction computation, a bus architecture is design for communication and data transmission. The computerized tomography system 30 includes a transmission imaging detection device a cluster workstation 31, and a graphic workstation 32. The detection signals of K ways of laser occlusion sensing devices 20 are reported to the cluster workstation 31 through a control bus 33, and the data collected by K sets of X-ray array detector 12 is also uploaded to the cluster workstation 31 through a data bus 34. The cluster workstation 31 not only collects projection data, but also preprocesses the projection data (such as denoising, logarithmic background removal, filtering, etc.), then uploads the processed data to the graphic workstation 32 through a transmission bus 35, and the graphic workstation 32 performs the final CT slice image reconstruction, display and data storage.

Please refer to FIG. 6. If the centers of all the X-ray sources are projected onto a plane perpendicular to the direction of motion of the measured object 200, all projections are distributed on the circumference with O as the center, and the circumference radius is defined as R. If the centers of all X-ray detectors 12 are projected onto a plane perpendicular to the direction of motion of the measured object 200, all projections are also distributed on the circumference with O as the center. The circumference radius is defined as P. The formula for calculating the image magnification of the projection imaging system is Q=D/R, wherein D=R+P, D is the distance from the center of the X-ray source 11 to the center of the detector 12.

The projection number K is an important parameter of the real-time computerized tomography imaging system. When the system is set to full scan mode, the sampling angle range of the projections is 2 π radians (i.e., 360 degrees of a complete circle), and when the system is set to short scan mode, the sampling angle range of the projections is π+2 γ radians (a little larger than half a circle, γ is the maximum fan angle of the fan beam CT). Place K X-ray light transmitters/detector sets along the length of the conveyor belt 100 with a length direction of L. Each set of detectors and light transmitters occupies a length of R in the direction of motion along the conveyor belt. R should be a constant according to the general design, but for the sake of universality, the length of each segment to set to be R(n), wherein n∈[1, K] and is a positive integer, Each of R(n) can be equal or unequal, but must be an integer times of the distance s of the planes of the adjacent slice planes, and must be greater than or equal to the minimum length of Umin required to install the X-ray source and detector.

Each R(n) segment can have a laser occlusion sensing device 20, consisting of a laser transmitter and a laser receiver, which can be used to detect whether the measured object enters or leaves the sensing segment. This can effectively reduce the cumulative error of the conveyor belt displacement sensor. To install a laser occlusion sensing device, R(n) must be greater than or equal to Umin+Vmin, here Vmin is the minimum length for installing a laser light transmitter and a laser receiver.

The connection lines between each set of X-ray sources and the center of the detector are defined as a central axis d(i), and that the central axes d(i) and d(i+1) of the adjacent sets are of a angles to each other. α is the rotation step angle of the projection for CT reconstruction, wherein i ∈ [1, K−1] and is a positive integer. The central axes may also be arranged out of order, but it must cover the circumferential angle sampled by all projection diagrams. For example, in full scan, when K=8, α=π/4, if the angle between the central axis d(i) and the plumb line is θ, then the angle of θ from d(1) to d(8) should be π/4, π/2, 3π/4, pi, 5π/4, 3π/2, 7π/4, 2π; also can be out of order designed as 2π, π/2, π, 3π/2, π/4, 5π/4, 3π/4, 7π/4. The number of designs out of order is a problem of permutations and combinations, which is not completely listed here.

There are K sets of laser occlusion sensing devices 20 and X-ray projection imaging devices 40: the output signal of the K sets laser occlusion sensing devices 20 are transmitted to the cluster workstation 31 through the control bus 33; the output signal of the K sets X-ray projection imaging devices 40 are transmitted to the cluster workstation 31 through the data bus 34. The cluster workstation 31 is responsible for all data collection and pre-processing. The pre-processed data is uploaded to the graphic workstation 32 through the transmission bus 35. The graphic workstation 32 reconstructs the CT slice and displays it. The cluster workstation 31 and the graphic workstation 32 both use GPU parallel processing to speed up operations. The whole process of data collection, processing, reconstruction, saving and display is pipelining, and the slice image is always updated in real time.

The signals on of the control bus 33 and the data bus 34 are refreshed in real time. The data processed by the cluster workstation 31 is directly transferred to the graphic workstation 32 through the transmission bus 35, so the slice imaging displayed by the graphic workstation 32 is able to updated in real time. To match the speed of projection sampling, both the cluster workstation 31 and the graphic workstation 32 use GPU parallel processing to speed up calculations. When the sampling frequency of each X-ray array detector is set to 20 the refresh frequency of the slice imaging by the graphic workstation 32 will also reach 20 Hz.

The present disclosure relates to a real-time transmission imaging detection device which arranges multiple sets of X-ray projection imaging devices 40 in turn along the translation direction of the measured object 200. Unlike conventional CT, there is no rotational movement during the whole detection process. Real-time computerized tomography imaging is able to achieved when the measured object 200 passes through all X-ray the projection imaging devices 40. The refresh frequency of the slice image can reach the sampling frequency of a single detector and can be used in the field of non-destructive detection and radiographic imaging.

The above description is only a preferred embodiment of the present disclosure and is not intended to restrict the present disclosure, which may vary in various changes and Variations for technicians in the field. Any modification, equivalent replacement, improvement, etc. made within the spirit and principles of the present disclosure shall be included in the scope of protection of the present disclosure.

What is claimed is:

1. A transmission imaging detection device for collecting projection diagrams of measured objects on a conveyor belt, wherein the transmission imaging detection device comprises X-ray projection imaging devices and laser occlusion sensing devices, the measured objects translate across the X-ray projection imaging devices and laser occlusion sensing devices on the conveyor belt, and the laser occlusion sensing devices determine whether the measured objects enter detection segments, the X-ray projection imaging devices collect projection data of the measured objects entering the detection segments; wherein the X-ray projection imaging devices comprise a number K of X-ray sources and a number K of X-ray array detectors, the laser occlusion sensing devices comprise a number K of laser transmitters and a number K of laser receivers, the number K of X-ray sources and the number K of X-ray array detectors are located on both sides of the thickness of the conveyor belt, the number K of laser transmitters and the number K of laser receivers are located on both sides of the width of the conveyor belt; a length of each X-ray array detector is A, a length of each X-ray source to the midpoint of the X-ray array detector is D, and a central line of the X-ray source to the X-ray array detector is perpendicular to the X-ray array detector, an angle between the X-ray array detector and the x-z surface is θ, wherein θ=nα, here α is a rotation step angle of CT projection sampling of a CT system, n∈[1,K] and is an integer; when the CT system is designed for full scan mode, α=2π/K; when the CT system is designed for short scan mode, α=(π+2γ)/K, wherein γ is the maximum fan angle; the conveyor belt drives the measured object to move horizontally at a speed of v, a direction of v is defined as z, a direction along the vertical line is defined as y, a direction perpendicular to v is defined as x, and the order of x, y and z axes satisfies the right-handed spiral rule.

2. The transmission imaging detection device according to claim 1, wherein the number K of X-ray sources and the number K of X-ray array detectors form the number K of sets of X-ray projection imaging devices, the number K of laser transmitters and the number K of laser receivers form the number K of sets of laser occlusion sensing devices, the number K of sets of X-ray projection imaging devices and laser occlusion sensing devices are arranged in sequence along the translation direction of the measured object.

3. The transmission imaging detection device according to claim 2, wherein a plane formed by a center of each of X-ray sources and an effective sensory segment of each of the X-ray array detectors is a projection imaging plane, and a number K of projection imaging planes are parallel to each others and not coplanar; a connection line between each of X-ray sources and a center of each of the X-ray array detectors is a central axis, and a number K of central axes are not coplanar and form a certain angle to each others.

4. The transmission imaging detection device according to claim 3, wherein the projection imaging plane and the central axes are perpendicular to the translation direction of the measured object.

5. The transmission imaging detection device according to claim 3, wherein a scan angle range on a circumference covered by the K central axes comprises a full scan angle range or a short scan angle range: the full scan angle range covers 2π radians; the short scan angle range covers π+2γ radians.

6. A computerized tomography system for imaging projection diagrams collected by a transmission imaging detection device, wherein the computerized tomography system comprises a transmission imaging detection device for collecting projection diagrams of measured objects on a conveyor belt, the transmission imaging detection device comprises X-ray projection imaging devices and laser occlusion sensing devices, the measured objects translate across the X-ray projection imaging devices and laser occlusion sensing devices on the conveyor belt, and the laser occlusion sensing devices determine whether the measured objects enter detection segments, the X-ray projection imaging devices collect projection data of the measured objects entering the detection segments, and a cluster workstations and a graphic workstation connected with the transmission imaging detection device; wherein the X-ray projection imaging devices comprise a number K of X-ray sources and a number K of X-ray array detectors, the laser occlusion sensing devices comprise a number K of laser transmitters and a number K of laser receivers, the number K of X-ray sources and the number K of X-ray array detectors are located on both sides of the thickness of the conveyor belt, the number K of laser transmitters and the number K of laser receivers are located on both sides of the width of the conveyor belt; a length of each X-ray array detector is A, a length of each X-ray source to the midpoint of the X-ray array detector is D, and a central line of the X-ray source to the X-ray array detector is perpendicular to the X-ray array detector, an angle between the X-ray array detector and the x-z surface is $\theta$, wherein $\theta=n\alpha$, here $\alpha$ is a rotation step angle of CT projection sampling of a CT system, $n \in [1,K]$ and is an integer; when the CT system is designed for full scan mode, $\alpha=2\pi/K$; when the CT system is designed for short scan mode, $\alpha=(\pi+2\gamma)/K$, wherein $\gamma$ is the maximum fan angle; the conveyor belt drives the measured object to move horizontally at a speed of v, a direction of v is defined as z, a direction along the vertical line is defined as y, a direction perpendicular to v is defined as x, and the order of x, y and z axes satisfies the right-handed spiral rule.

7. The computerized tomography system according to claim 6, wherein detection signals of the laser occlusion sensing devices are reported to the cluster workstation by a control bus; data collected by the X-ray array detectors are uploaded to the cluster workstation by a data bus; and the cluster workstation uploads collected projection data to the cluster workstation by a transmission bus, the graphic workstation reconstructs a projection.

8. The computerized tomography imaging system according to claim 7, wherein centers of all X-ray sources are projected onto a plane perpendicular to a direction of motion of the measured objects, all projections are distributed on a circumference with O as a center, and a radius of the circumference is defined as R; if centers of all X-ray detectors are projected onto a plane perpendicular to a direction of motion of the measured objects, all projections are also distributed on a circumference with O as a center, a radius of the circumference is defined as P, then a formula for calculating a image magnification of the projection imaging system is Q=D/R, here D=R+P, D is the distance from the centers of the X-ray source to the centers of the detector.

9. The computerized tomography imaging system according to claim 7, wherein an update frequency of the projection diagram is equal to a sampling frequency of each of the X-ray array detectors.

* * * * *